United States Patent [19]

Naaktgeboren

[11] Patent Number: 4,503,762
[45] Date of Patent: Mar. 12, 1985

[54] KNOTTER TRIP MECHANISM

[75] Inventor: Adrianus Naaktgeboren, Veldegem, Belgium

[73] Assignee: Sperry Corporation, New Holland, Pa.

[21] Appl. No.: 599,370

[22] Filed: Apr. 12, 1984

[51] Int. Cl.³ .......................................... B65B 13/26
[52] U.S. Cl. ...................................................... 100/4
[58] Field of Search ................ 56/341, 342, 433, 434; 100/4, 19 R

[56] References Cited

U.S. PATENT DOCUMENTS

| | | | |
|---|---|---|---|
| 1,158,654 | 11/1915 | Dudley | 100/4 |
| 2,560,143 | 7/1951 | Vietti | 100/4 |
| 2,772,628 | 12/1956 | Nolt | 100/4 |
| 2,822,749 | 2/1958 | Nolt | 100/4 X |
| 2,897,748 | 8/1959 | Nolt | 100/4 |
| 2,981,173 | 8/1961 | Nolt | 100/4 X |
| 3,092,226 | 6/1963 | Williamson | 100/4 X |

*Primary Examiner*—Billy J. Wilhite
*Attorney, Agent, or Firm*—Darrell F. Marquette; Larry W. Miller; Frank A. Seemar

[57] ABSTRACT

In a baler having a plunger reciprocating in a bale case and knotters for tying strands of twine around bales, two trip mechanisms are provided for automatic actuation of the knotters. One trip mechanism is capable of preventing operation of the knotters until a bale of desired length is formed. The other trip mechanism is capable of preventing operation of the knotters unless the plunger is moving in a direction in the bale case to compress crop material into bales.

11 Claims, 6 Drawing Figures

KNOTTER TRIP MECHANISM

BACKGROUND AND SUMMARY OF THE INVENTION

This invention relates generally to agricultural balers and, in particular, to knotter trip mechanisms for such balers.

In a conventional type of baler, a plunger reciprocates in a bale case to form crop material into rectangular bales. Knotters are provided to tie several strands of twine around the bales, and trip mechanisms are employed for automatically actuating the knotters when bales reach a deired length. Such a trip mechanism is disclosed in U.S. Pat. No. 2,897,748.

The present invention provides a baler including a bale case, a plunger reciprocating in the bale case, a knotter mounted on the bale case for tying a strand of twine around a bale, and first trip means for preventing operation of the knotter until a bale of predetermined length is formed. The baler also includes second trip means, independent from the first trip means, for preventing operation of the knotter unless the plunger is moving in a direction in the bale case to compress crop material into bales. The second trip means is movable from one position where it can prevent operation of the knotter to another position where it cannot prevent operation of the knotter when the plunger moves in the direction in the bale case to compress crop material into bales.

DESCRIPTION OF THE PREFERRED EMBODIMENT

Figure 1:
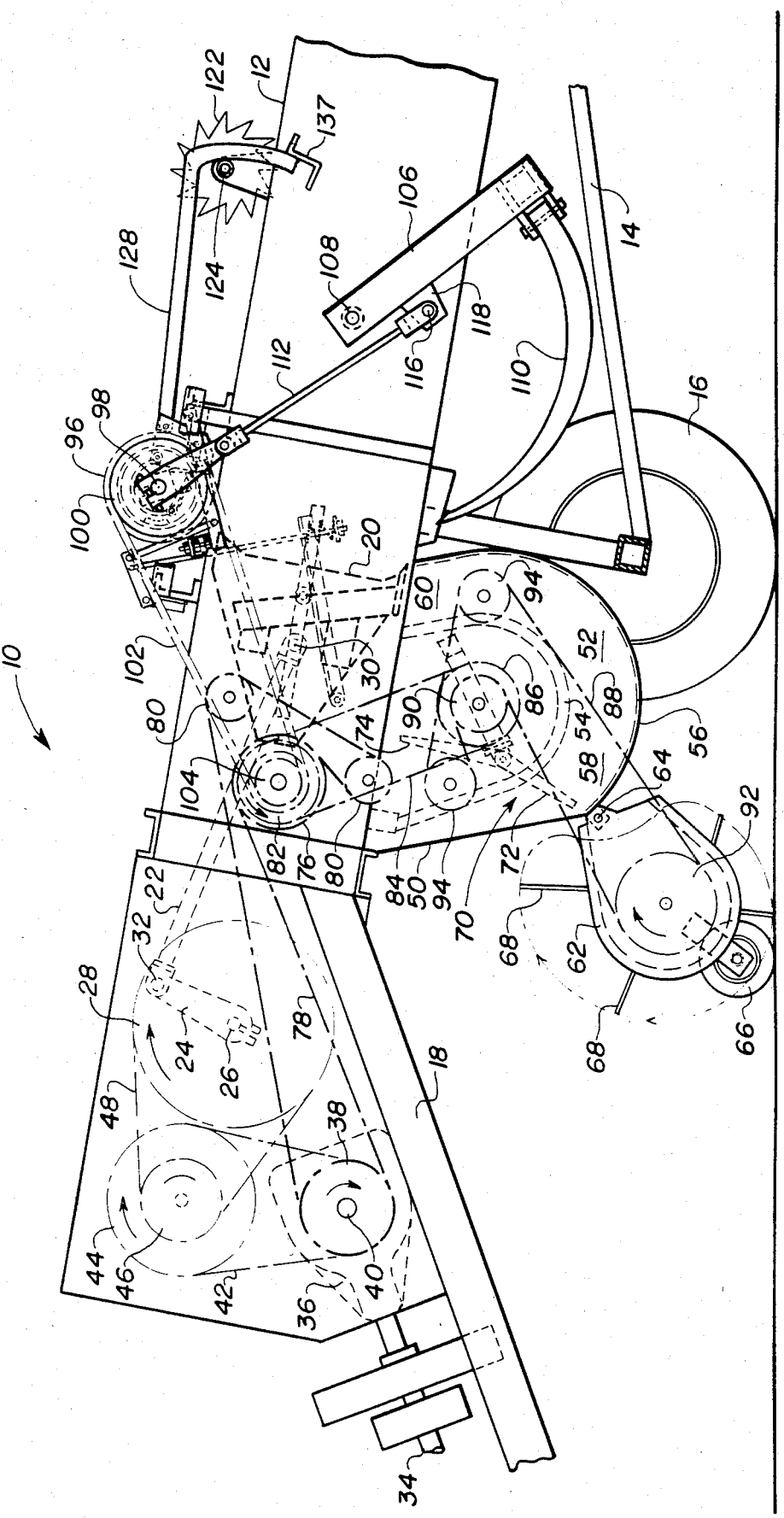
FIG. 1 is a side elevation view of a baler embodying the preferred embodiment of the present invention.

Referring to FIG. 1, a baler 10 includes a bale case 12 mounted on a frame 14 which is supported by wheels 16. A tongue 18 extends forwardly from the bale case 12 for attachment to a tractor (not shown). A plunger 20 is reciprocably disposed in the bale case 12 to form crop material into rectangular bales. The plunger 20 is attached by a connecting rod 22 to a crank arm 24 fixed to a shaft 26 on which a sprocket 28 is fixedly mounted. The connecting rod 22 has a pivotal connection 30 at one end with the plunger 20 and another pivotal connection 32 at the other end with the crank arm 24.

A drive shaft 34 is connected at one end to a gearbox 36 carried on the baler 10 and is adapted for connection at the other end to the PTO of a tractor (not shown). The drive shaft 34 causes clockwise rotation, as viewed in FIG. 1, of a double sprocket 38 which is fixed to the output shaft 40 of the gearbox 36. The double sprocket 38 is connected via a chain 42 to a sprocket 44 of larger diameter. A sprocket 46 is fixed to rotate with the sprocket 44. This arrangement of sprockets provides a speed reduction from the double sprocket 38 to the sprocket 46. A chain 48 connects the sprocket 46 to the sprocket 28 to cause clockwise rotation of the sprocket 28, as viewed in FIG. 1, in order to cause reciprocation of the plunger 20 is a fore-and-aft direction in the bale case 12.

A feed chamber 50 is mounted underneath the base case 12 and includes a curved duct 52 having top and bottom walls 54 and 56, respectively, and sidewalls. The top wall 54 is formed of a series or curved channel members, of inverted generally U-shaped cross-section, which are arranged side-by-side so that there are slots defined between adjacent channel members. The bottom wall 56 is formed primarily of a single curved, continuous panel member. The curved duct 52 is open at its lower end 58 and at its upper end 60 and communicates at its upper end 60 with an inlet opening formed in the bottom wall of the bale case 12. A pickup device 62 of a conventional type is pivotally connected at 64 to the feed chamber 50 and is supported by wheels 66. The pickup device 62 includes a plurality of fingers 68 which are rotatable in the direction indicated in FIG. 1 for lifting crop material from the ground and delivering it toward the feed chamber 50.

A feeder mechanism 70 is provided in the feed chamber 50 for moving crop material toward the lower end 58 of the duct 52, then through the duct 52 from its lower end 58 to its upper end 60, and then into the bale case 12 through the inlet opening in the bottom wall thereof. The feeder mechanism 70 includes two sets of feeder elements or tines 72,74 arranged to project through the slots in the top wall 54 of the duct 52.

The double sprocket 38 is connected to a sprocket 76 mounted on the side of the base case 12 by a chain 78 in a backwrap manner to cause rotation of the sprocket 76 in a counterclockwise direction as indicated. The chain 78 also extends around idlers 80. Another sprocket 82 fixed to rotate with the sprocket 76 is connected by a chain 84 to a sprocket 86 to cause counterclockwise rotation of the sprocket 86 and thus operation of the feeder mechanism 70. A belt 88 extends around a sheave 90 that is connected to the sprocket 86 in a backwrap manner and around another sheave 92 on the pickup device 62 to rotate the sheave 92 in a clockwise direction and thus operate the pickup device 62. The belt 88 also extends around idlers 94, the forward one of which is preferably spring loaded to allow vertical movement of the pickup device 62 and to allow the belt 88 to slip if the pickup device 62 is overloaded.

Figure 2:
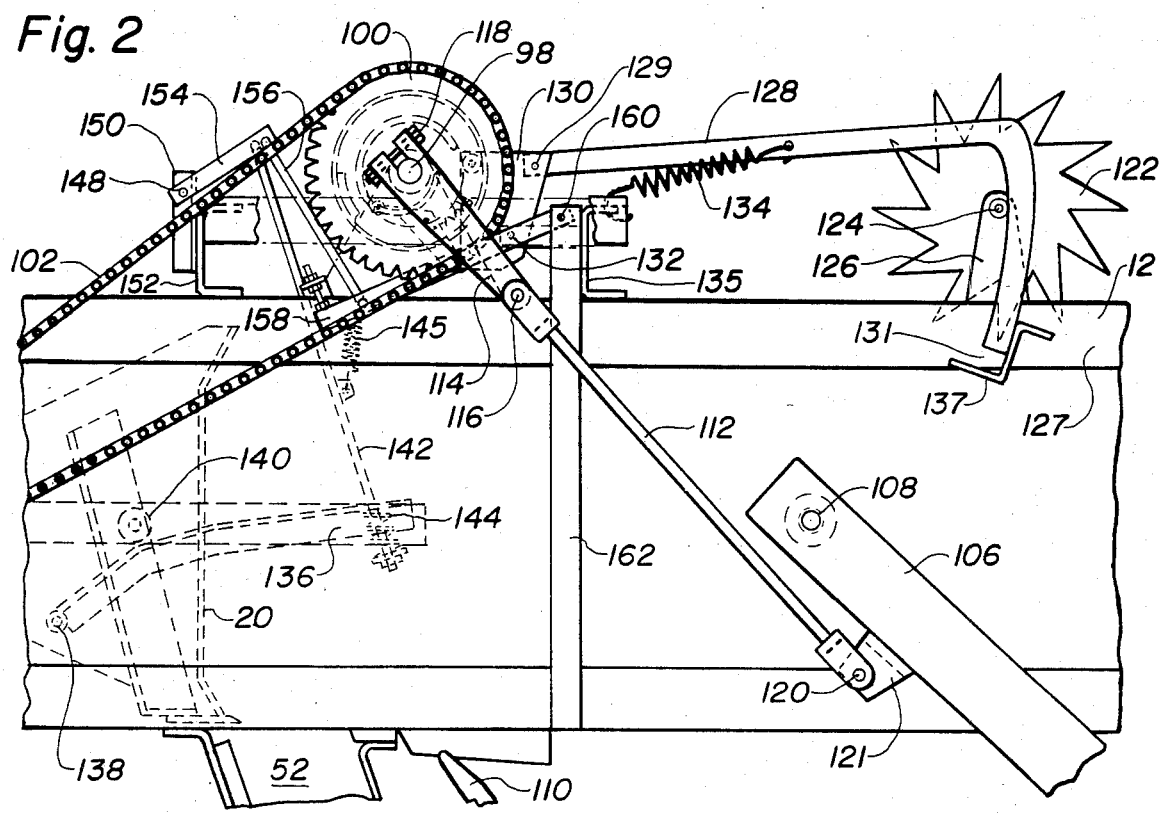
FIG. 2 is an enlarged view of a portion of the baler of FIG. 1.
Figure 3:
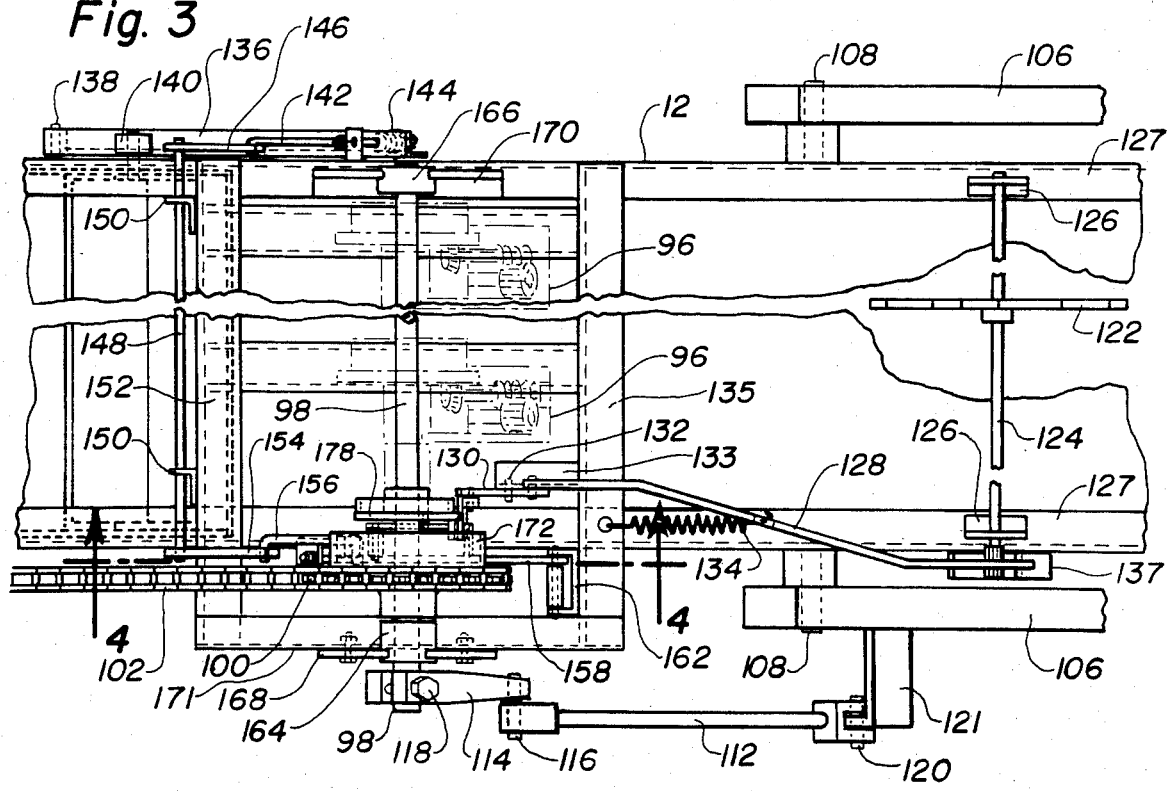
FIG. 3 is a plan view of the portion of the baler shown in FIG. 2.

The baler 10 includes a system for tying several strands of twine around a completed bale. This system includes a plurality of conventional knotters 96 (two of which are partially shown in phantom in FIG. 3) mounted above the bale case 12. The knotters 96 are driven by a shaft 98 on which a sprocket 100 is rotated. A chain 102 extends around the sprocket 100 and another sprocket 104 that is connected to rotate with the sprockets 76 and 82. The various sprockets are sized so that the sprocket 100 rotates twice as fast as the sprocket 28. Accordingly, the knotters 96, when actuated as explained later, will be driven at twice the speed of the plunger 20. A yoke 106 is pivoted on stub shafts 108 carried on the sides of the bale case 12. The yoke 106 carries a plurality of twine needles 110 for delivering strands of twine to the knotter 96 which form knots therein. As also seen in FIGS. 2 and 3, a link 112 is pivotally connected at one end to a crank arm 114 by a pin 116. The crank arm 114 is clamped to the shaft 98 by a bolt 118. The other end of the link 112 is pivotally connected to a pin 120 to a bracket 121 carried on the yoke 106. A tripping device for actuating the tying system includes a star wheel 122 fixed on a shaft 124 that is rotatably supported in brackets 126 mounted on the upper corner rails 127 of the bale case 12. The tripping device also includes an arm member 128 operatively coupled to the shaft 124 in a conventional manner, such as disclosed in U.S. Pat. No. 2,897,748.

Referring now to FIGS. 2 and 3, it will be seen that the arm member 128 has a plate 130 pivoted thereto at its forward end by a pin 129. The plate 130 is pivoted on a pin 132 carried on a frame member 133 of the bale case 12. A spring 134 is connected between the arm member 128 and a transverse beam 135 on the bale case 12 to urge the arm member 128 in a forward direction relative to the bale case 12. A ramp 136 is pivoted at one end on a pin 138 on the side of the bale case 12, and a roller 140 carried by the plunger 20 is positioned to roll along the upper surface of the ramp 136. A rod 142 extends through the other end of the ramp 136, and a spring 144 is disposed on the rod 142 underneath the upper surface of the ramp 136. A spring 145 is connected between rod 142 and the bale case 12. The rod 142 is connected at its upper end to a link 146 shown in FIG. 3, which is secured to a rod 148 that extends transversely above the bale case 12. The rod 148 is rotatably supported in brackets 150 attached to a transverse beam 152. Another link 154, shown in FIGS. 2 and 3, is fixed to the rod 148 opposite the link 146. A rod 156 is connected at its upper end to the link 154 and at its lower end to a further link 158. The link 158 is pivoted by a pin 160 to a vertical beam 162. As seen best in FIG. 3, the shaft 98 is rotatably supported at its ends in bearings 164,166 carried by brackets 168,170. Bracket 168 is secured to a beam 171 extending between the transverse beams 135 and 152, and bracket 170 is secured to the bale case corner rail 127.

Figure 4:
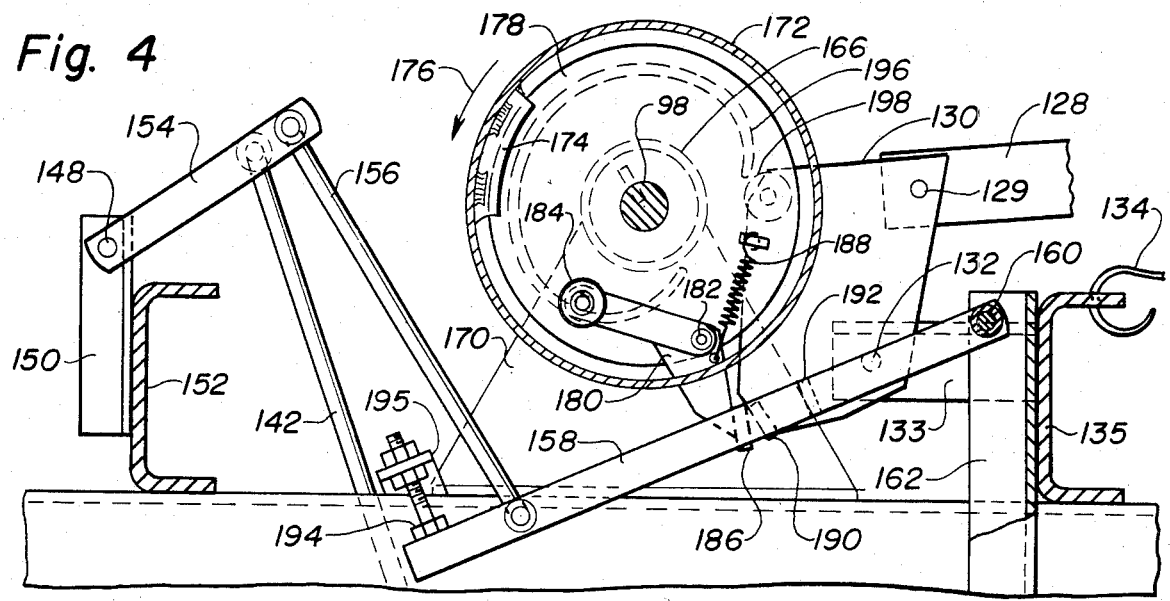
FIG. 4 is an enlarged sectional view taken along lines 4—4 in FIG. 3.

Referring to FIG. 4, a hub 172 shown in cross-section is bolted to the sprocket 100. The hub 172 has a cam lobe 174 welded to its inner surface, and the hub 172 is rotated in the direction indicated by the arrow 176. A disk 178 is keyed to the shaft 98 behind the hub 172 as also seen in FIG. 3. A pawl assembly 180 is pivoted at 182 on the disk 178, and carries a roller 184 at one end for engagement with the cam lobe 174 on the hub 172. The end of the pawl assembly 180 opposite the roller 184 is formed with a tab 186. A spring 188 is connected between the pawl assembly 180 and the disk 178 to urge the pawl assembly 180 in a counter-clockwise direction about pivot 182 as viewed in FIG. 4. The plate 130 carries a tab 190 disposed to engage the tab 186 on the pawl assembly 180. The link 158 also carries a tab 192 for engagement with the pawl assembly tab 186.

Figure 6:
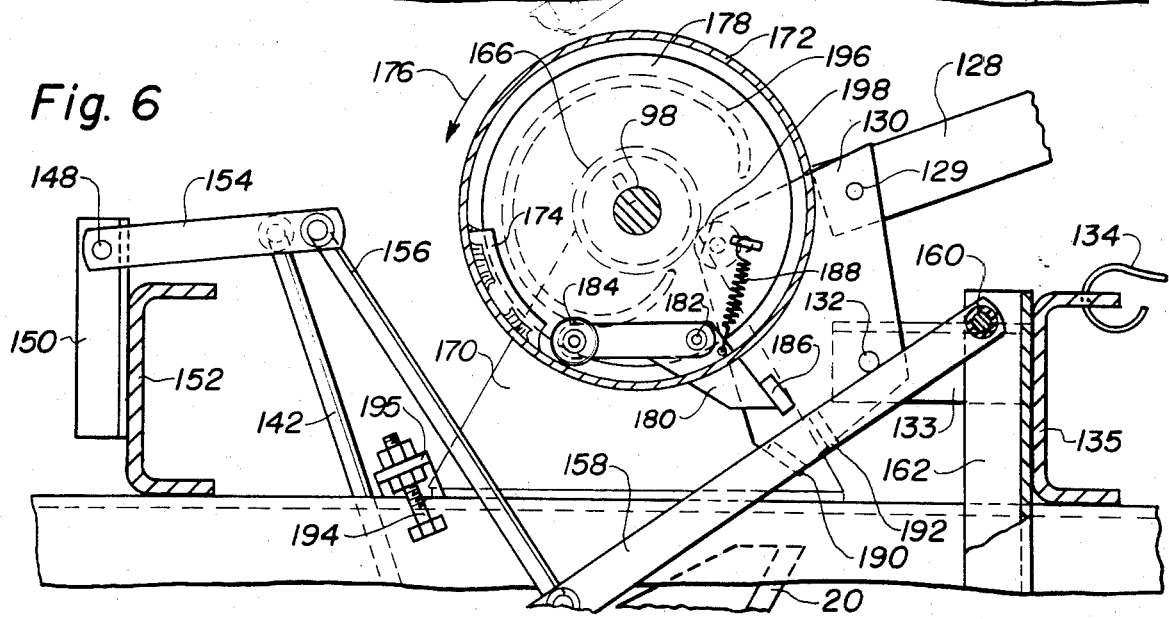

In operating the baler 10, crop material is delivered into the bale case 12 by the feeder mechanism 70 where it is then compressed into bales by the plunger 20. As a bale is being formed, the arm 128 is in the position shown in FIGS. 2 and 4 so that the tab 190 thereon engages the tab 186 on the pawl assembly 180. This holds the pawl assembly 180 in a position where the roller 184 is out of the path of movement of the cam lobe 174 on the hub 172 which is constantly rotated with the sprocket 100 in the direction indicated by the arrow 176. Therefore, the disk 178 and the shaft 98 are stationary and the knotters 96 are idle for the time being. Meanwhile, the reciprocating movement of the plunger 20 in the bale case 12 causes the roller 140 to roll back and forth along the upper surface of the ramp 136. When the plunger 20 is moved rearward in the bale case 12 past the phantom position shown in FIG. 2, the roller 140 pushes the ramp 136 downward about the pin 138. The rod 142 is pulled downward by the ramp 36 thereby pulling the link 146 downward and rotating the rod 148 in the brackets 150. The link 154 is pushed downward by the rod 148 thereby pushing the rod 156 downward. The link 158 is pushed downward by the rod 156 to the position shown in FIG. 6 so that the tab 192 formed thereon is moved out of the way of the tab 186 on the pawl assembly 180. When the plunger 20 is subsequently moved forward in the bale case 12 toward the phantom position of FIG. 2, the roller 140 is disengaged from the upper surface of the ramp 136. This allows the ramp 136, the rods 142,156 and the links 146,154,158 to return to the positions shown in FIGS. 2 and 4 due to the spring 145. The link 158 engages a bolt 194 mounted in a bracket 195 on the bale case 12 to limit its upward movement. It should be understood that the link 158 is continuously oscillated between the positions of FIGS. 4 and 6 during reciprocation of the plunger 20 in the bale case 12.

Figure 5:
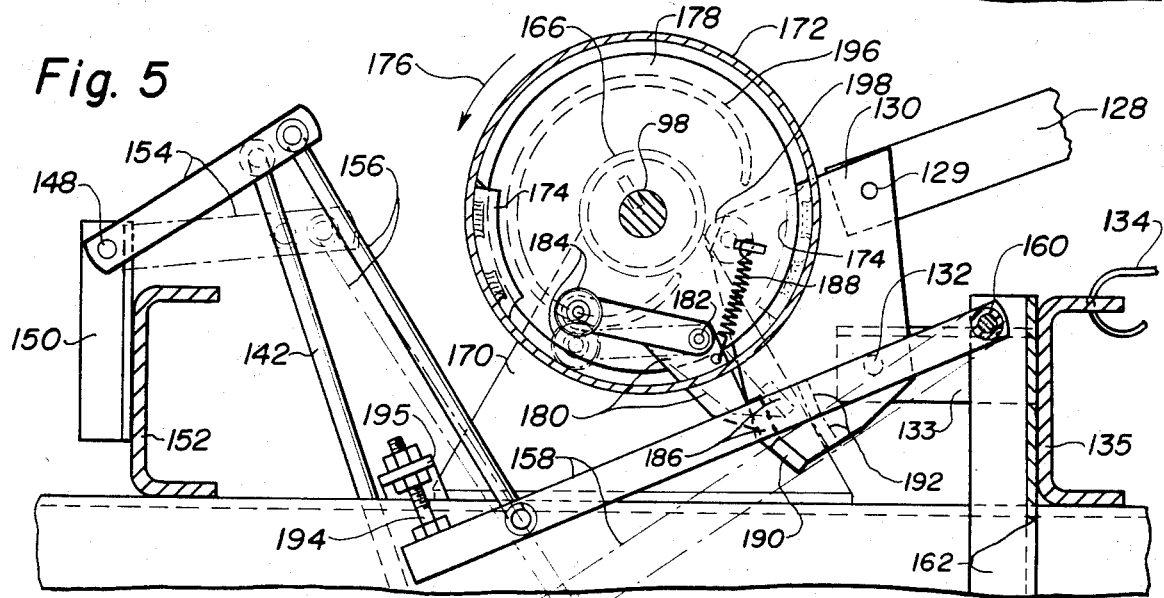
FIGS. 5 and 6 are views similar to FIG. 4 taken at various stages in the operation of the baler.

When a bale has reached the desired length, the starwheel 122 and the shaft 124 will have rotated far enough to cause the arm 128 to be pivoted upwardly about the pin 129 to a point where the slot 131, that is defined between the end of the arm 128 and a bracket 137 which is attached thereto, receives the shaft 124. The arm 128 is then moved forward with respect to the bale case 12 by the spring 134 thereby resulting in rotation of the plate 130 about the pin 132 to the position shown in in FIG. 5 where the tab 190 on the plate 130 is out of engagement with the tab 186 on the pawl assembly 180. The spring 188 immediately urges the pawl assembly 180 to rotate in a counterclockwise direction about pivot 182 so that the roller 184 engages the inner surface of the hub 172 in the path of movement of the cam lobe 174 as shown in phantom in FIG. 5. Unless the plunger 20 is moving toward the end of its rearward stroke, the link 158 will be in or will be quickly returning to the position shown in full lines in FIG. 5. Therefore, the pawl assembly tab 186 will engage the tab 192 on the link 158 before the disk 178 and the shaft 98 can be rotated far enough to actuate the tying system. The pawl assembly 180 will be pivoted in a clockwise direction about pivot 182 to the full line position of FIG. 5 where the roller 184 is again out of the path of movement of the cam lobe 174. It should be realized that the shaft 98 and the disk 178 must be rotated a few degrees in order for the pawl assembly tab 186 to engage the tab 192 on the link 158. This slight rotation of the shaft 98 does not, however, cause any substantial movement of either the needles 110 or the knotters 96. The needles 110 and the knotters 96 remain inactive for now. When the plunger 20 moves toward the end of its rearward stroke, the link 158 is pushed downward to the position shown in FIG. 6 moving the tab 192 thereon out of engagement with the pawl assembly tab 186. The spring 188 again urges the pawl assembly 180 to the position where the roller 184 is in the path of movement of the cam lobe 174. The cam lobe 174 engages the roller 184 rotating the disk 178 and the shaft 98 to actuate the tying system. That is, the needles 110 are moved through the bale case 12 to deliver twine to the knotters 96 which are driven to form knots in the twine. The disk 178 carries a cam track 196 which engages a roller 198 on the plate 130 as the disk 178 is rotated. This serves to reset the arm 128 to the position shown in FIG. 2 after one complete (360°) revolution of the disk 178. The tab 190 on the plate 130 is returned to the position shown in FIG. 4 so that it reengages the tab 186 on the pawl assembly 180. This returns the pawl assembly 180 to the position shown in FIG. 4 following a single revolution of the disk 178 and the shaft 98.

It will be understood that in the preferred embodiment of the baler 10 disclosed herein the knotters 96, when actuated, are driven at twice the speed of the plunger 20. That is, the knotters 96 each make one knot tying cycle while the plunger 20 makes one-half of a complete stroke. The relative high speed of the knotters 96 allows their knot tying cycle to be completed while the plunger 20 is still engaged with the bale or, in other words, while the bale is still under compression from the plunger 20. Therefore, twine will be tied around the bale before the bale has an opportunity to spring back, thereby resulting in the bale being of relatively high density.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. A baler comprising:
   (a) a bale case;
   (b) a plunger reciprocating in said bale case;
   (c) a knotter mounted on said bale case for tying a strand of twine around a bale;
   (d) first trip means for preventing operation of said knotter until a bale of predetermined length is formed; and
   (e) second trip means, independent from said first trip means, for preventing operation of said knotter unless said plunger is moving in a direction in said bale case to compress crop material into bales.

2. The bales of claim 1, wherein said second trip means is movable between one position where it can prevent operation of said knotter and another position where it cannot prevent operation of said knotter.

3. The baler of claim 2, wherein said second trip means moves from said one position to said another position when said plunger moves in the direction in said bale case to compress crop material into bales.

4. The baler of claim 3, wherein said second trip means comprises a ramp movably mounted on said bale case, and a roller carried on said plunger for contacting said ramp.

5. The baler of claim 4, wherein said second trip means further comprises a link connected to said ramp, said link including a tab for preventing said knotter from operating.

6. The baler of claim 1, wherein said knotter operates twice as fast as said plunger.

7. In a baler including a bale case, a plunger reciprocating in said bale case, a knotter mounted on said bale case for tying a strand of twine around a bale, first trip means for preventing operation of said knotter until a bale of predetermined length is formed, the improvement comprising:
   second trip means, independent from said first trip means, for preventing operation of said knotter unless said plunger is moving in a direction in said bale case to compress crop material into bales.

8. The improvement of claim 7, wherein said second trip means is movable between one position where it can prevent operation of said knotter and another position where it cannot prevent operation of said knotter, said second trip means moves from said one position to said another position when said plunger moves in the direction in said bale case to compress crop material into bales.

9. The baler of claim 5, wherein said link and said ramp are each pivotally mounted on said bale case for upward and downward movement.

10. The baler of claim 9, further comprising spring means normally urging said link upwardly into a position where said tab is disposed to prevent operation of said knotter.

11. The baler of claim 10, further comprising means on said bale case for engagement with said link to limit its upward movement.

* * * * *